United States Patent [19]

Taylor et al.

[11] 3,970,588
[45] July 20, 1976

[54] CATALYST FOR HYDRAZINE DECOMPOSITION

[75] Inventors: William F. Taylor, Scotch Plains; Martin Lieberman, Newark, both of N.J.

[73] Assignee: Exxon Research and Engineering Company, Linden, N.J.

[22] Filed: Dec. 23, 1969

[21] Appl. No.: 3,608

[52] U.S. Cl. ............................ 252/459; 252/466 B; 252/474; 149/36
[51] Int. Cl.² .......................................... B01J 29/10
[58] Field of Search ............... 60/219, 220; 149/36; 252/459, 463, 466 B, 460, 455, 457, 472, 474

[56] References Cited
UNITED STATES PATENTS

| | | | |
|---|---|---|---|
| 2,814,599 | 11/1957 | Lefrancois et al. | 252/460 X |
| 3,513,109 | 5/1970 | Stiles | 252/466 B |
| 3,591,649 | 7/1971 | Kroll et al. | 252/459 |
| 3,607,961 | 9/1971 | Kovach et al. | 252/466 B X |
| 3,608,313 | 9/1971 | Guth et al. | 149/36 X |

*Primary Examiner*—Samuel W. Engle
*Assistant Examiner*—Peter A. Nelson
*Attorney, Agent, or Firm*—C. A. Cohen; B. O. Dimmick

[57] ABSTRACT

A catalyst for initiating the spontaneous decomposition of hydrazine and hydrazine nitrate into ammonia, nitrogen and hydrogen comprises ruthenium supported on high-surface area silica, alumina or silica-alumina substrates promoted with oxides of alkalis, alkaline earths, transition elements and rare earths. The catalyst is particularly useful in monopropellant rocket engines and gas generators and is characterized by: high activity when used in either a pulsed or continuous mode, minimal loss in crush strength or surface area after firing and use of non-strategic materials.

9 Claims, No Drawings

3,970,588

CATALYST FOR HYDRAZINE DECOMPOSITION

FIELD OF INVENTION

This invention relates to a catalyst for initiating the spontaneous decomposition of hydrazine and hydrazine nitrate and mixtures thereof into ammonia, nitrogen and hydrogen. More particularly, this invention is concerned with catalysts for use in mono-propellant rocket thrusters and gas generators. The use of a rocket thruster comprising a catalyst bed and a source of mono-propellant such as hydrazine which will decompose spontaneously into a high volume of gaseous products when fed to the bed without the use of special initiators offers many advantages. The hardware required for such a system is relatively simple and inexpensive, temperature of decomposition is sufficiently low so as to obviate the use of super-alloys in construction and with highly active catalysts the catalyst bed may be kept short enough to provide a high ratio of thrust to weight of thruster.

PRIOR ART

Technical Report 32-1227, "The Status of Monopropellant Hydrazine Technology" by T. W. Price and D. D. Evans issued by the National Aeronautics and Space Administration - Jet Propulsion Laboratory summarizes all of the prior art and pertinent technology up to Feb. 15, 1968. This report, which is incorporated herein by reference, details the performance of a catalyst, for the spontaneous decomposition of hydrazine, which comprises slightly over 30 percent by weight, based on total catalyst mass, of iridium supported on an aluminum oxide carrier having a surface area of 160 $m^2/gm$.

SUMMARY OF INVENTION

We have now found that catalysts comprising ruthenium supported on a sintered substrate selected from the group consisting of high-surface area silica, alumina and silica-alumina, promoted with oxides of the alkalis, alkaline earths, transition elements of Group IIIB and the rare earths of the Lanthanide series will readily initiate the spontaneous decomposition of hydrazine alone or in admixture with hydrazinium nitrate, ammonia or water. Such catalysts offer many advantages over the catalysts reported in the prior art.

A major advantage of the catalyst of the instant invention over catalysts in the prior art having the same order of activity is in the use of ruthenium which is readily available at a moderate cost compared to the comparatively rare and expensive iridium which is in the main only recovered from the refining of platinum. By contrast, ruthenium which is available in the free world as a non-strategic material in about ten times the quantity of iridium, can be used to prepare highly active catalysts at costs which are of the order of one-fourth to one-fifth of the cost for an iridium catalyst of the same metal content.

Over and above the advantage of availability and cost, the catalysts of this invention are characterized by high thermal stability, high crush strength which minimizes production of "fines" with their attendant loss with the exit gases, maintenance of high surface area and activity with either continuous or pulsed use, insensitivity to moisture and rapid reaction time on contact as measured by ignition delay of less than 5 milliseconds at 25°C.

DESCRIPTION OF PREFERRED EMBODIMENTS

1. Substrates of 91 percent Promoters

Suitable catalysts having high activity may be prepared from substrates consisting of silica, alumina and silica-alumina with the latter having a composition in the range of 80 – 95 wt. percent of alumina ($Al_2O_3$) and 5 – 20 wt. percent of silica ($SiO_2$), being the preferred substrate. While suitable materials, for example, a silica-alumina containing about 91 percent alumina manufactured by Harshaw Chemical Company and sold as Harshaw 1602 catalyst are available commercially, typical methods for the preparation of these substrates are given in Volume 1 of "Catalysis" pages 340-342 edited by P. H. Emmett, Reinhold Publishing Corp., New York, 1954. For any of the above substrates, it is essential that the crystal lattice be stabilized by sintering prior to treating with promoter. This may be done, for example, by heating in air at a temperature of about 980°C. for about 5 hours.

2. Promoters

Catalyst promoters which may be present in amounts of from 2 to 10 wt. percent, preferably 4–8 percent on the weight of the final catalyst are preferably incorporated into the substrate as an oxide prior to the incorporation of the ruthenium. Suitable promoters are selected from oxides of alkali metals having atomic numbers in the range of 3 to 55 of Group IA of the Periodic Table; oxides of the alkaline earths having atomic numbers in the range of 4 to 56 of Group IIA of the Periodic Table; oxides of transition elements of Group IIIB of the Periodic Table having atomic numbers in the range of 21 to 57; and oxides of the Lanthanide Series of the Periodic Table having atomic numbers in the range of 58 to 71 inclusive. The promoter may be incorporated into the substrate by co-precipitation, or an aqueous or organic solvent solution of a salt or compound of the promoter may be used to impregnate the substrate. In the latter case, it is advantageous to use compounds which decompose on thermal treatment to oxides.

Suitable solutions for the alkali metals may be made from the hydroxides, nitrates, acetates or oxalates for example using water, or alcoholic solutions may be employed of the hydroxides or alkoxides (ROM) where R is a $C_1$ to $C_5$ acyclic alkyl radical and M is an alkali metal. After allowing the sintered substrate to imbibe the solution, it is allowed to drain, dry in air and calcined at temperatures in the range of 375° to 425°C. in air to convert the alkali metal salt or compound to its oxide. The process of imbibition may be repeated with solutions of suitable concentration until the desired level of promoter concentration has been reached.

Similarly, suitable solutions of alkaline earths, transition elements and lanthanide elements as defined above may be made using water or organic solvents such as lower alcohols, ethers, lower ketones, dimethyl sulfoxide and the like of oxides, hydroxides, salts such as nitrates and acetates, and chelates of diketones such as acetyl acetone or nitrilo acids such as ethylene diamine tetracetic acid.

The promoter may be incorporated into the substrate while the substrate is in a granular form which is subsequently pilled and sintered or the substrate may be first pilled, sintered and then treated with promoter.

3. Preparation of Typical Catalyst

A high purity silica-alumina catalyst containing 93.75 wt. percent $Al_2O_3$ and 6.25 wt. percent $SiO_2$ was pressed into cylindrical pills measuring one-eighth inch by one-eighth inch in diameter. The pilled catalyst base was heated in the presence of air at a temperature of 990° ± 10°C. for 5 hours in order to stabilize it. After cooling, the catalyst which had a surface area of 182.4 square meters per gram as measured by the BET method (Brunauer, Emmett & Teller: J.A.C.S. 60, 309 (1938)) was soaked for one-half hour in a 5 wt. percent solution of strontium nitrate in deionized water, drained from excess solution and allowed to dry in air. The air-dried pills were further dried by heating at 150°C. for 2 hours and then calcined in the presence of air at 400°C. for 5 hours.

The soaking, drying and calcining was repeated until the strontium oxide take-up on the substrate was equal to 7.15 wt. percent of the total mass.

The substrate containing strontium oxide promoter was then saturated with a 25 wt./vol. solution of ruthenium trichloride in 90 percent aqueous-isopropyl alcohol and the procedure of saturation at room temperature, drying at 150°C. and calcining at 400°C. repeated until the desired level of 30 wt. percent ruthenium was reached. Other compounds of ruthenium such as the acetoacetonate may be used instead of the chloride.

The catalyst as prepared above was finally activated by heating at a temperature of 540°C. in a stream of flowing hydrogen for 5 hours. Analysis of the catalyst showed a strontium oxide content of 5 wt. percent and ruthenium of 30 wt. percent.

Using the same procedure, silica-alumina substrates promoted with the oxides of cesium, rubidium, calcium, magnesium, barium, yttrium, lanthanum and cerium were prepared and used as supports for the ruthenium. Surface areas for the catalysts prepared as above fell in the range of 210–240 for the silica-alumina before sintering; 155–175 after incorporation of the promoter; and 120–135 square meters per gram for the finished catalyst containing 30 wt. percent of ruthenium.

All of the catalysts were highly active in initiating the spontaneous decomposition of hydrazine at room temperature and when tested in a five pound rocket thruster showed ignition delays from cold starts (25°C.) of less than 5 milliseconds.

Further tests of selected catalysts were made in a 25 pound thruster using a bed of catalyst pellets plus a small layer of 20–40 mesh catalyst in the inlet of the catalyst chamber region where the catalyst first encounters the hydrazine. No loss in activity or crush strength for these catalysts was observed in continuous firings or in pulsed firings of one second duration on-alternated with 5 seconds off. No pressure drop was observed through the catalyst bed after as many as fifty firings and average loss of catalyst due to attrition with the exit gases was nominal.

While a concentration of 30 wt. percent of ruthenium in the total catalyst mass appears to be the economic optimum for use in rocket thrusters designed for long life and intermittent or pulsed use in an aero-apace milieu, we have prepared catalysts having high activity with as little as 7.5 wt. percent and as high as 35 wt. percent ruthenium. Where the primary purpose is gas generation, longer catalyst beds may be used advantageously to ensure maximum dissociation of ammonia to nitrogen and hydrogen.

What is claimed is:

1. A catalyst capable of initiating the spontaneous decomposition of hydrazine, hydrazine nitrate, and mixtures thereof into gaseous products, which consists essentially of a minor proportion of ruthenium supported on a major proportion of a stabilized substrate selected from the group consisting of silica, alumina, and silica-alumina, together with a minor proportion of a promoter selected from the group consisting of an oxide of an element of Group IA having an atomic number in the range of 3 to 55, an oxide of an element of Group IIA having an atomic number in the range of 4 to 56, an oxide of a transition element of Group IIIB having an atomic number in the range of 21 to 57, and an oxide of an element of the Lanthanide series having an atomic number in the range of 58 to 71, of the Periodic Table;

the content of ruthenium in said catalyst being within the range of 7.5 to 35 wt. percent of the total catalyst mass, and the content of said promoter in said catalyst being within the range of from 2 to 10 wt. percent, based on the total catalyst mass.

2. Catalyst according to claim 1, wherein the stabilized substrate has a BET surface area in excess of 150 square meters per gram.

3. Catalyst according to claim 1 wherein the substrate is silica.

4. Catalyst according to claim 1 wherein the substrate is alumina.

5. Catalyst according to claim 1 wherein the substrate is silica-alumina having an alumina content in the range of 80 to 95 wt. percent and the silica content is in the range of 5 to 20 wt. percent.

6. Catalyst according to claim 1 wherein the oxide is selected from the group consisting of oxides or lithium, sodium, potassium, rubidium, and cesium.

7. Catalyst according to claim 1 wherein the oxide is selected from the group consisting of oxides of beryllium, magnesium, calcium, strontium and barium.

8. Catalyst according to claim 1 wherein the oxide is selected from the group consisting of oxides of scandium, yttrium and lanthanum.

9. Catalyst according to claim 1 wherein the oxide is selected from the group consisting of the oxides of the lanthanide group of elements beginning with cerium and progressing arithmetically by one atomic number through the series ending with lutecium.

* * * * *